(12) United States Patent
Vasilyeva et al.

(10) Patent No.: US 9,405,855 B2
(45) Date of Patent: Aug. 2, 2016

(54) PROCESSING DIFF-QUERIES ON PROPERTY GRAPHS

(71) Applicants: Elena Vasilyeva, Dresden (DE); Maik Thiele, Dresden (DE); Christof Bornhoevd, Palo Alto, CA (US); Wolfgang Lehner, Dresden (DE)

(72) Inventors: Elena Vasilyeva, Dresden (DE); Maik Thiele, Dresden (DE); Christof Bornhoevd, Palo Alto, CA (US); Wolfgang Lehner, Dresden (DE)

(73) Assignee: SAP AG, Walldorf (DE)

(*) Notice: Subject to any disclaimer, the term of this patent is extended or adjusted under 35 U.S.C. 154(b) by 182 days.

(21) Appl. No.: 14/227,065

(22) Filed: Mar. 27, 2014

(65) Prior Publication Data

US 2015/0278396 A1    Oct. 1, 2015

(51) Int. Cl.
G06F 17/30    (2006.01)

(52) U.S. Cl.
CPC .... *G06F 17/30958* (2013.01); *G06F 17/30442* (2013.01); *G06F 17/30657* (2013.01); *G06F 17/30979* (2013.01)

(58) Field of Classification Search
USPC .................................. 707/769, 798
See application file for complete search history.

(56) References Cited

U.S. PATENT DOCUMENTS

| | | | | |
|---|---|---|---|---|
| 6,169,986 B1* | 1/2001 | Bowman | ........... | G06F 17/30395 |
| 6,529,948 B1* | 3/2003 | Bowman-Amuah | .. | G06F 9/4435 709/217 |
| 7,315,855 B2* | 1/2008 | Carlson | ............ | G06F 17/30483 |
| 7,379,941 B2* | 5/2008 | Bostrom | ................ | G06N 5/006 |
| 8,380,738 B2* | 2/2013 | Tatemura | .......... | G06F 17/30557 707/760 |
| 8,417,709 B2* | 4/2013 | Chiticariu | ......... | G06F 17/30616 705/7.11 |
| 8,954,422 B2* | 2/2015 | Hasan | .......................... | 707/723 |
| 2011/0119245 A1* | 5/2011 | Sargeant | ........... | G06F 17/30451 707/706 |
| 2011/0231418 A1* | 9/2011 | Biron | ............... | G06F 17/30554 707/756 |
| 2012/0158791 A1* | 6/2012 | Kasneci | ........... | G06F 17/30958 707/798 |
| 2014/0067781 A1* | 3/2014 | Wolchok | ........... | G06F 17/30392 707/701 |
| 2014/0067850 A1* | 3/2014 | Schrock | ............ | G06F 17/30587 707/769 |
| 2014/0172914 A1* | 6/2014 | Elnikety | ........... | G06F 17/30979 707/774 |
| 2014/0244687 A1* | 8/2014 | Shmueli | ............ | G06F 17/30587 707/780 |
| 2014/0280307 A1* | 9/2014 | Gupta | ................ | G06F 17/30657 707/769 |
| 2014/0310302 A1* | 10/2014 | Wu | .................... | G06F 17/30442 707/769 |
| 2015/0026158 A1* | 1/2015 | Jin | .................... | G06F 17/30979 707/722 |
| 2015/0120775 A1* | 4/2015 | Shao | ................. | G06F 17/30498 707/769 |

\* cited by examiner

*Primary Examiner* — Cam-Linh Nguyen

(74) *Attorney, Agent, or Firm* — Sterne, Kessler, Goldstein & Fox P.L.L.C.

(57) ABSTRACT

A system, computer-implemented method, and a computer-readable medium for determining why a query returns a null set in a database management system. When the database management system receives a query graph, database management system compares the query graph to the data graph. Based on the comparison, database management system identifies a discovered component of the query graph and a missing component of the query graph, wherein the missing query component indicates a reason for the null set.

20 Claims, 5 Drawing Sheets

300

302

Algorithm 1 The MCCS algorithm for a property graph

1: function MCCS_Search(query graph $G_q$)
2:     *graphs, tmp*
3:     for all *edge $q_i$* in $G_q$ do
4:         *sources$_i$ = getSourceVertices($q_i$)*
5:         *graph = DFS(sources$_i$, $q_i$, true, graphs$_i$)*
6:         *graphs.addGraph(graph)*
7:     for all *graphs$_i$* do
8:         if *graphs$_i$ > tmp* then *tmp = graphs$_i$*
9: return *tmp*
10: /*depth-first search*/
11: function DFS(*sources, edges, isStart, graphs*)
12:     for all *sources$_j$* do
13:         if *!isStart* then *edge = getNextEdge(edge)*
14:         if *noNextEdge* then return *graph*
15:         *targets = traverse(edge)*
16:         *filterTargets(targets)*
17:         for all *targets$_d$* do
18:             *graphs.addEdge(edge, sources$_j$, targets$_d$)*
19:             *graph = DFS(targets$_d$, edge, false, graph)*
20:     return *graph*

FIG. 3

PROCESSING DIFF-QUERIES ON PROPERTY GRAPHS

BACKGROUND

Background Art

Data in the form of graphs represents data from multiple domains. For example, graphs show relationships between different data objects, as well as relationships between data objects and properties of these objects. These relationships may be mapped to vertices and edges in a data graph, such as a property graph.

A graph database implementing a property graph data model provides schema-flexible storage and supports complex, expressive queries. Example queries include shortest path query, reachability query and graph isomorphism query. However, the flexibility and expressiveness of these queries may result in an unexpected empty answer even though corresponding data exists in the data graph. This may occur when a query has been overspecified and even if relevant data is in the database the data might not be found because it does not exactly match the query constraints. To understand the reason for an empty answer, query issuers create and resubmit alternative queries, which may be a cumbersome and time consuming task.

BRIEF DESCRIPTION OF THE DRAWINGS/FIGURES

The accompanying drawings, which are incorporated herein and form a part of the specification FIG. 1 is a block diagram of an exemplary database system.

FIG. 3 is a diagram of exemplary pseudo code that generates a maximum common sub-graph, according to an embodiment.

In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, method and/or computer program product embodiments, and/or combinations and subcombinations thereof, for determining discovered and missing components of a query.

Database Management System

Figure 1:
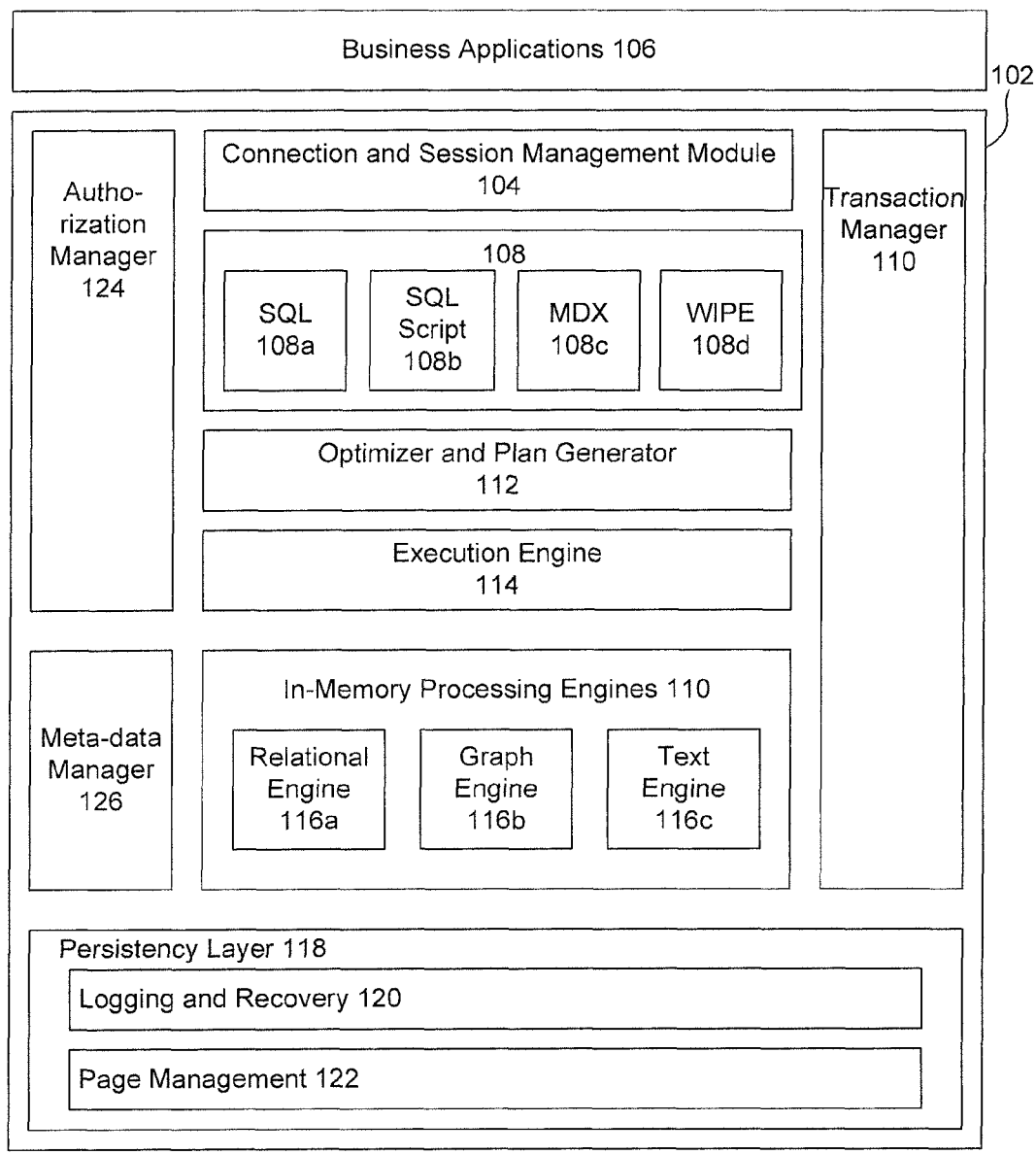

FIG. 1 is a block diagram 100 of an exemplary database management system 102. Database management system 102 may be a memory-centric data management system that leverages hardware capabilities, such as vast main memory space, multi core CPUs and GPU processors, and storage device division (SDD) storage.

In an embodiment, database management system 102 includes connection and session management module 104. Connection and session management module 104 creates and manages sessions and connections for database clients. Database clients may be computing devices under a control of a user (also referred to as client devices) that access and/or execute business applications 106. Business applications 106 are custom or generic applications that include applications related to social media, bio-informatics, and business processing, to name a few examples.

Once connection and session management module 104 establishes a session, database clients may use database languages 108, to manipulate data associated with business applications 106. Example database languages 108 include structured query language (SQL) 108a, SQL Script 108b (a scripting language for describing application specific calculations inside the database), a MultiDimensional eXpressions (MDX) 108c and WIPE (for data graph processing) 108d, to give a few non-limiting examples.

In an embodiment, transaction manager 110 ensures that database management system 102 provides ACID (atomicity, consistency, isolation, durability) properties. A person skilled in the art will appreciate that in the embodiments the ACID properties ensure that the database transactions are processed reliably and in order. For example, transaction manager 110 coordinates database transactions, controls transactional isolation, and keeps track of running and closed transactions.

In an embodiment, optimizer and plan generator 112 parses and optimizes client requests that, for example, may be made using database languages 108. For example, optimizer and plan generator 112 may generate an execution plan for executing the client request in database management system 102. Once generated, optimizer and plan generator 112 passes the execution plan to execution engine 114.

In an embodiment, execution engine 114 invokes an in-memory processing engine 116a-c to process the execution plan. Execution engine 114 may invoke a different in-memory processing engine 116a-c based on the execution plan type. Example in-memory processing engines 116a-c include a relational engine 116a, a graph engine 116b and a text engine 116c.

In an embodiment, relational engine 116a processes structured data. Relational engine 116a supports both row- and column-oriented physical representations of relational tables. In an embodiment, column-oriented data is stored in a highly compressed format in order to improve the efficiency of memory resource usage and to speed up the data transfer from disk storage to cache memory or from cache memory to CPU.

In an embodiment, graph engine 116b and text engine 116c support efficient representation and processing of unstructured data. For example, graph engine 116b processes data graphs. To enable efficient graph access and processing, graph engine 116b provides a set of base operations that act upon a graph. In an embodiment, these operations may be invoked using WIPE 108d, a graph query manipulation language. In an embodiment, graph engine 116b supports resource planning applications having large numbers of individual resources and complex mash-up interdependencies. Graph engine 116b also supports efficient execution of transformation processes (such as data cleansing in data-warehouse scenarios) and enables the ad-hoc integration of data from different sources.

In an embodiment, text engine 116c provides text indexing and search capabilities. Example text indexing and search capabilities include search for words and phrases, fuzzy search (which tolerates typing errors), and linguistic search (which finds variations of words based on linguistic rules). In addition, text engine 116c ranks search results and supports searching across multiple tables and views.

In an embodiment, persistency layer 118 provides durability and atomicity to transactions. Persistency layer 118 includes a logging and recovery module 120 and a page management module 122. Logging and recovery module 120 logs data, changes in data, and transaction requests to a memory storage disk. Those transactions and data changes may be performed by in-memory processing engines 116a-c, as well as requests issued by multiple client devices.

Page management module 122 provides an interface for writing and reading data from memory cache and disk storage for processing by in-memory processing engines 116a-c.

Persistency layer 118 uses logging and recovery module 120 and page management module 122 to ensure that database management system 102 is restored to the most recent committed state after a restart or system failure. Persistency layer 118 also ensures that transactions are either completely executed or completely undone. To achieve this efficiently, persistency layer 118 uses techniques such as combining write-ahead logs, shadow paging, and save-points that are known to a person of skilled in the relevant art.

In an embodiment, database management system 102 includes an authorization manager 124. Authorization manager 124 determines whether a user has the required privileges to execute the requested operations. A privilege grants a right to perform a specified operation (such as create, update, select, or execute). The database management system 102 also supports analytical privileges that represent filters or hierarchy drill-down limitations for analytical queries, as well as control access to values with a certain combination of dimension attributes.

In an embodiment, metadata manager 126 manages metadata in database management system 102. Example metadata includes table definitions, views, indexes, and the definition of SQL script functions.

As discussed above, database management system 102 includes graph engine 116b. Graph engine 116b processes data in the form of graphs. To process data graphs, graph engine 116b includes an internal graph application program interface (API) that provides a set of core operators. The core operators are the building blocks for graph data query and manipulation language, such as WIPE. Also, the core operators may be leveraged to implement higher level graph processing algorithms, such as shortest path, nearest neighbor, minimum spanning tree, maximum flow, or transitive closure calculations, to name a few examples.

In database management system 102, a data graph may be represented as a property graph. A property graph supports diverse data with different degrees of structure in a form of a graph. A property graph is a directed graph where vertices are entities and edges are relationships between the vertices. Each edges and vertex in a property graph may be described using one or more attributes and values associated with the attributes. An example attribute may be a name-value pair. In one embodiment, a vertex attribute may include a unique identifier, and a pair attribute may represent a semantic type of a connection. The vertices and edges may also be represented by an arbitrary number of attributes, which can differ between vertices or edges of the same semantic type. Advantageously, a data graph represented as a property graph does not require a predefined and rigid database schema common to relational database management systems.

Figure 2:
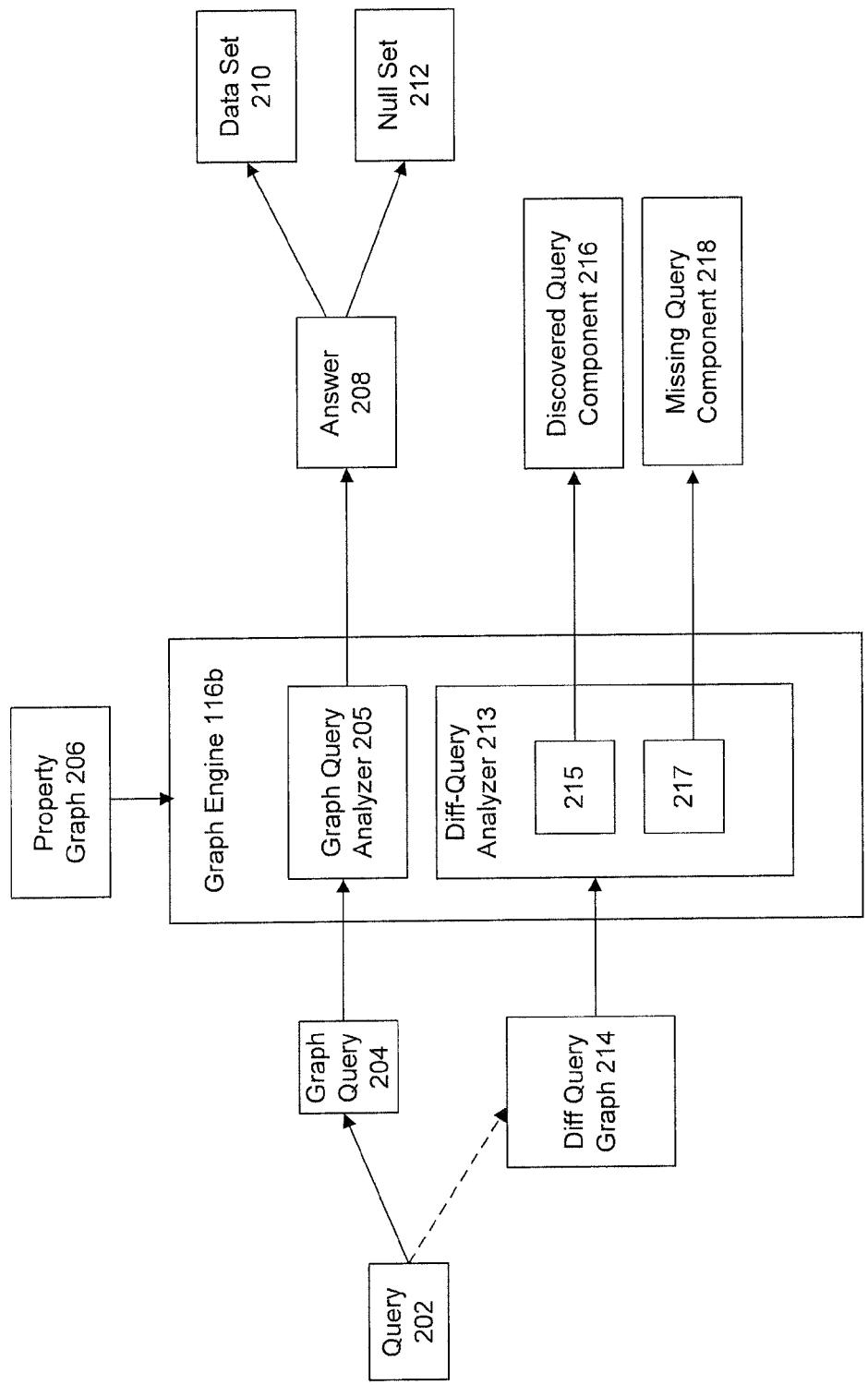
FIG. 2 is a block diagram of a system for processing graph queries and diff-queries, according to an embodiment.

In graph database, a query may be used to seek a pattern in a data graph. FIG. 2 is a block diagram 200 of a system for processing graph queries and diff-queries, according to an embodiment. In block diagram 200, database management system 102 receives query 202. Once database management system 102 receives, database management system 102 transforms query 202 into graph query 204. Graph engine 116b then generates an answer for graph query 204 using graph query analyzer 205. For example, graph query analyzer 205 searches property graph 206. In an embodiment, property graph 206 is a representation of a data graph in database management system 102. The search generates an answer 208 that includes data responsive to graph query 204. In one embodiment, answer 208 may include data set 210. In another embodiment, answer 208 may include a null set, such as a null set 212. In some embodiments, graph query analyzer 205 may return null set 212 when graph data for query 202 exists in property graph 206. Once graph query analyzer 205 generates answer 208, database management system 102 returns answer 108 to an issuer of query 202.

In an embodiment, to determine a reason for null set 212, graph engine 116b communicates with a diff-query analyzer 213. In an embodiment, diff-query analyzer 213 may be a component within or outside of graph engine 116b. Diff-query analyzer 213 processes diff-query 214 of query 202. Diff-query 214 shows components of query 202 that graph query analyzer 205 discovered in property graph 206 and components of query 202 that are missing from property graph 206. For example, when diff-query analyzer 213 processes diff-queries 214, diff-query analyzer 213 returns a discovered query component 216 and a missing query component 218.

In an embodiment, to determine discovered query component 216 and missing query component 218, diff-query analyzer 213 determines maximum common sub-graphs between property graph 206 and graph query 204. Then diff-query analyzer 213 identifies a maximum common sub-graph 215 from maximum common sub-graphs. Maximum common sub-graph 215 represents discovered query component 216.

In an embodiment, diff-query analyzer 213 then calculates a difference graph 217. Difference graph 217 represents a difference between maximum common sub-graph 215 and query graph 204. Difference graph 217 represents missing query component 218.

In an embodiment, mathematically, property graph 206 and sub-graphs within property graph 204 may be represented using vertices and edges. For example, property graph 206 may be defined as a directed graph $G=(V, E, u, f, g)$ over attribute space $A=A_V \cup A_E$, where:

V and E are finite sets of vertices V and edges E;

$u: E \rightarrow V^2$ is a mapping between vertices V and edges E;

$f(V)$ and $g(E)$ are attribute functions for vertices and edges; and $A_V$ and $A_E$ are the attribute spaces for attribute functions $f(V)$ and $g(E)$, respectively.

A connected sub-graph of the directed graph G may be defined as $G'=(V', E', u', f', g')$ if $V' \subseteq V$, $E' \subseteq E$, $u'|_{u'}$, $f'|_{f'}$ and $g'|_{g'}$.

In an embodiment, a data graph $G_d$ that is represented as property graph 206 and a query graph $G_q$ (query graph 204) have a common connected sub-graph $G'_d \subseteq (V'_d, E'_d, u'_d, f'_d, g'_d)$, if $G'_d$ is a common connected sub-graph of graph $G_d$ and $G_q$. In an embodiment, there may be multiple common connected sub-graphs $G'_d$ in data graph $G_d$ for a query graph $G_q$.

In an embodiment, one or more of common connected sub-graphs $G'_d$ may be a maximum common connected sub-graph $G'_d$ (maximum common sub-graph 215). A maximum connected sub-graph $G'_{dmax}$ of data graph $G_d$ and query graph $G_q$ may exist when $S_{max}$ that in $G_d$ and $G_q$ is such that $S \leq S_{max}$: $V \leq V_{max} \cup E \leq E_{max}$. The maximum connected sub-graph $G'_{dmax}$ may be used to determine discovered query component 216 and missing query component 218 in diff-query 214.

In an embodiment, maximum common connected sub-graph $G'_{dmax}$ of query graph $G_q$ and data graph $G_d$ may be determined using one or more sub-graph algorithms. In an embodiment, a graph may be stored in an adjacency matrix or an adjacency list on which sub-graphs algorithms operate. For example, matrix M may consist of n×n elements, where n represents a number of vertices in the graph. Further, each element in matrix M having a value of 1 represents an edge between $vertex_i$ and $vertex_j$. When property graph 206 or another graph is stored as a matrix M, maximum connected sub-graph 215 may be calculated using linear algebra operations. Further, when the graph represented using matrix M is a property graph, then the attributes of the property graph may be stored in a separate data structure and can be used to pre-filter matrix M prior to determining the maximum connected sub-graph 215. A person skilled in the art will appreciate that pre-filtering may reduce a number of mathematical operations required to determine maximum connected sub-graph 215 and hence increase performance of an overall system.

In an embodiment, Ullmann and McGregor algorithms may be applied to matrix M and generate a maximum connected sub-graph $G'_{dmax}$. Ullmann and McGregor algorithms are known to a person of ordinary skill in the art. For example, Ullmann algorithm is a tree-search enumeration algorithm which eliminates successor vertices in property graphs. Also, Ullmann algorithm may exclude elements in matrix M, which may reduce the size of a search space. In an embodiment, diff-query analyzer 213 may use Ullmann algorithm when diff-query analyzer 213 requires an exact match between data graph $G_d$ and query graph $G_q$.

In an embodiment, McGregor algorithm is a backtracking algorithm that may be used to generate a maximum connected sub-graph $G'_{dmax}$ (maximum connected sub-graph 215). McGregor algorithm may also be used with pruning techniques and pre-filtering options that further reduce the search space in property graph 206 required to generate the maximum connected sub-graph $G'_{dmax}$.

In an embodiment, diff-query analyzer 213 may also use a Durand-Pasari algorithm or a Balay Yu algorithm. Each of these algorithms is well known and may be efficient in determining maximum connected sub-graph $G'_{dmax}$ in data graphs that are sparse data graphs or dense data graphs, and are also known to a person of ordinary skill in the art.

Once diff-query analyzer 213 determines maximum connected sub-graph $G'_{dmax}$, diff-query analyzer 213 uses maximum connected sub-graph $G'_{dmax}$ to determine missing query component 218. To determine missing query component 218, diff-query analyzer 213 determines a difference graph 217 that represents a difference between graph query 204 and maximum connected sub-graph $G'_{dmax}$. For example, difference graph 217 includes query vertices and edges that were not discovered when diff-query analyzer 213 was processing query graph 204 and generating maximum connected sub-graph $G'_{dmax}$, as well as the instances of query vertices adjacent to a maximum common connected sub-graph $G'_{dmax}$.

In an embodiment, difference graph 217 may be defined as a graph $G'_q = (V'_q, E'_q, u'_q, f'_q, g'_q, V'_d(adj), C)$, where $V'_q \subseteq V_q$, $E'_q \subseteq E_q$, $u'_q|_{uq}$, $f'_q|_{fq}$, and $g'_q|_{gq}$, $V'_d(adj)$ are adjacent vertices, and C is a set of non-adjacent discovered vertices that diff-query analyzer 213 can exclude from further search.

In an embodiment, when graph query analyzer 205 processes query 202 and returns null set 212, diff-query analyzer 213 may receive diff-query 214 for query 202. Diff-query analyzer 213 then processes diff-query 214 which generates discovered query component 216 and missing query component 218 for query 202.

FIG. 3 is a diagram of exemplary pseudo code 300 that generates a maximum common sub-graph, according to an embodiment. Pseudo code 300 operates on graphs stored in a graph database, such as a graph database discussed in FIG. 1.

In an embodiment, graph database may be a column based database that describes vertices and edges in respective set of tables. For example, vertices may be described by a set of columns in terms of attributes associated with the vertices, while edges may be stored in adjacency lists in a table. Further, each edge may have multiple attributes which are stored with the description of the edge. In an embodiment, vertices and edges may be represented using unique identifies.

In an embodiment, pseudo code 300 uses McGregor algorithm that traverses property graphs 206. McGregor algorithm in FIG. 3 is labeled as an algorithm 302. Algorithm 302 begins at line 1 and completes at line 20. Algorithm 302 generates a maximum common sub-graph as it processes tables in the-column based database. An input to algorithm 302 is query graph 204. An output of algorithm 302 is maximum common sub-graph 215.

Once algorithm 302 receives query graph 204 as input, algorithm 302 identifies the edges in query graph 204. Algorithm 302 then uses the identified edges in query graph 204 to identify start vertices that generate the identified edges at line 4.

At line 5, algorithm 302 invokes a DFS function that begins on line 11. The DFS function receives the start vertices, an edge that is associated with the start vertices and generates a maximum common sub-graph for the start vertices. Once the DFS function generates maximum common sub-graph, algorithm 302 adds the generated maximum common sub-graph to a list of common sub-graphs at line 6. Algorithm 302 then repeats the process for a different edge in query graph 204.

Once algorithm 302 completes generating maximum common sub-graphs (for example, when algorithm 302 traverses all edges in query graph 204), algorithm 302 traverses the list of common sub-graphs at lines 7-9 and identifies maximum common sub-graph 215 from the list. Maximum common sub-graph 215 is a discovered query component 216.

In an embodiment, after algorithm 302 generates maximum common sub-graph 215, diff-query analyzer 213 determines missing query component 218. To determine missing query component 218, diff-query analyzer 213 identifies the discovered and undiscovered vertices and edges. Once diff-query analyzer 213 identifies the undiscovered vertices and edges, diff-query analyzer 213 completes the undiscovered vertices and edges with attributes or vertices conditions and generates missing query component 218.

In an embodiment, data generated by algorithm 302 may also be used to determine the undiscovered vertices and edges. For example, as algorithm 302 executes, diff-query analyzer 213 maintains a mapping between data graph edges and query graph edges, and data graph vertices and query graph vertices in temporary tables. From temporary tables, diff-query analyzer 213 generates difference graph 217. Difference graph 217 consists of query graph 204 vertices and edges that are not represented in the temporary tables.

In an embodiment, diff-query analyzer 213 then completes difference graph 217 to generate missing query component 218. For example, one or more edges in difference graph 217 may have a start vertex, but not an end vertex, or vice versa. Here, diff-query analyzer 213 determines the missing start or end vertex and includes the missing start or end vertex into difference graph 217. To determine the missing start or end vertex, diff-query analyzer 213 analyzes the temporary tables that include the discovered vertices and query description and assigns vertices and edges to difference graph 215 according to predefined rules. For example, when query edge is not included in the temporary table, but the vertex that the query edge points to is included in the temporary table, than diff-query analyzer 213 also includes the vertex into difference graph 215. In another example, if a query vertex and all of query edges associated with the vertex (both edges that begin and end at the vertex) are included in the temporary tables, then diff-query analyzer 213 excludes the vertex from difference graph 215. Once diff-query analyzer 213 completes the above analysis, difference graph 215 becomes missing query component 218.

In an embodiment, diff-query analyzer 213 may perform optimization techniques to optimize algorithm 302. When diff-query analyzer 213 initiates algorithm 302 from each query vertex, diff-query analyzer 213 initiates algorithm 302 multiple times. Each time, algorithm 302 generates a maximum connected sub-graph that diff-query analyzer 213 adds to a maximum connected sub-graph list. Then diff-query analyzer 213 determines maximum common sub-graph 215 from the maximum common sub-graph list.

To reduce the number of times algorithm 302 may be executed, diff-query analyzer 213 may choose the order of edges in query graph 204 from which to obtain the start vertices. For example, diff-query analyzer 213 may choose an order of edges according to a number of previous or next edges. This way, a vertex having a maximum number of incoming and outgoing edges may be selected as a starting point for algorithm 302. For example, for a vertex having a higher number of edges, more edges require processing, and as such, there is a greater chance for algorithm 302 to discover the maximum common sub-graph 215 earlier.

To reduce the number of times algorithm 302 may be executed, diff-query analyzer 213 may also determine cardinality for vertices and edges in query graph 204. Cardinality is a quantified relationship between vertices and edges, and/or between attributes associated with vertices and edges. Diff-query analyzer 213 then sorts the cardinality of the vertices and edges in ascending order, and chooses the edge with the lowest cardinality as the start edge in line 4 of algorithm 302. In an embodiment, diff-query analyzer 213 may also choose direction of the search based on the cardinality of a source and target vertices. In an embodiment, where algorithm 302 restarts the maximum connected sub-graph search at line 5, diff-query analyzer 213 may use cardinality of edges to determine whether to initiate a maximum connected sub-graph search. For example diff-query analyzer 213 may discard an edge from the search where an edge has a cardinality of zero.

In an embodiment, diff-query analyzer 213 may also use cardinality to determine when to terminate algorithm 302. In the embodiment in FIG. 3, algorithm 302 terminates when all edges of query graph 204 have been traversed, no additional edges have been found and the backtracking procedure in the DFS function completes. However, diff-query analyzer 213 may also use the cardinality to determine a threshold that terminates the search prior to the above conditions being met. For example, if query graph 204 has N edges, then for M edges the cardinality(M)>0, where M $\in$ N. Here the maximum common sub-graph 215 can have at most M edges. After algorithm 302 identifies a maximum common sub-graph having M edges, diff-query analyzer 213 terminates algorithm 302.

In one example, suppose query graph 204 has four vertices and three edges, where the predicate cardinality of edge 1=5, cardinality of edge 2=2 and cardinality of edge 3=0. Here, maximum common sub-graph 215 may have at most two edges. As such, diff-query analyzer 213 may terminate algorithm 302 when algorithm 302 identifies maximum common sub-graph with two edges.

Figure 4:
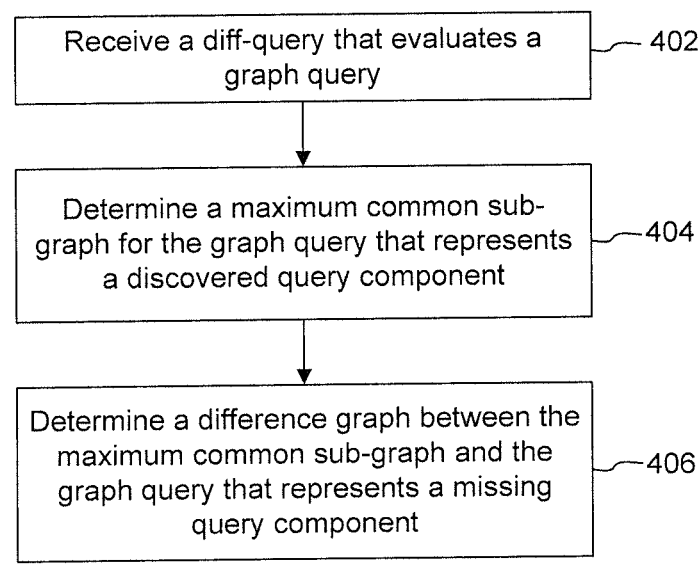
FIG. 4 is a flowchart of a method for determining discovered and missing query components, according to an embodiment.

FIG. 4 is a flowchart of a method 400 for determining discovered and missing query components, according to an embodiment.

At operation 402, a diff-query that evaluates a graph query is received. For example, diff-query analyzer 213 receives graph query 204, that, when it was previously executed generated null set 212. To determine the reason for the null set 212, diff-query 214 determines discovered query component 216 and missing query component 218 for query 204.

At operation 404, a maximum common sub-graph is generated. For example, diff-query analyzer 213 compares graph query 204 that was received in operation 406 to a data graph, that may be stored as a property graph 206. During the comparison, using algorithm 302 or another algorithm, diff-query analyzer 213 determines maximum common sub-graph 215 between graph query 204 and property graph 206. In an embodiment, maximum common sub-graph 215 may be discovered query component 216.

At operation 406, a missing query component is generated. For example, diff-query analyzer 213 determines difference graph 217 between query graph 204 and maximum common sub-graph 215 generated at operation 404. Once generated, difference graph 217 may be modified to include additional start and end vertices whose incoming or outgoing edges are already included in difference graph 217. In an embodiment, difference graph 217 may be the missing query component 218.

Figure 5:
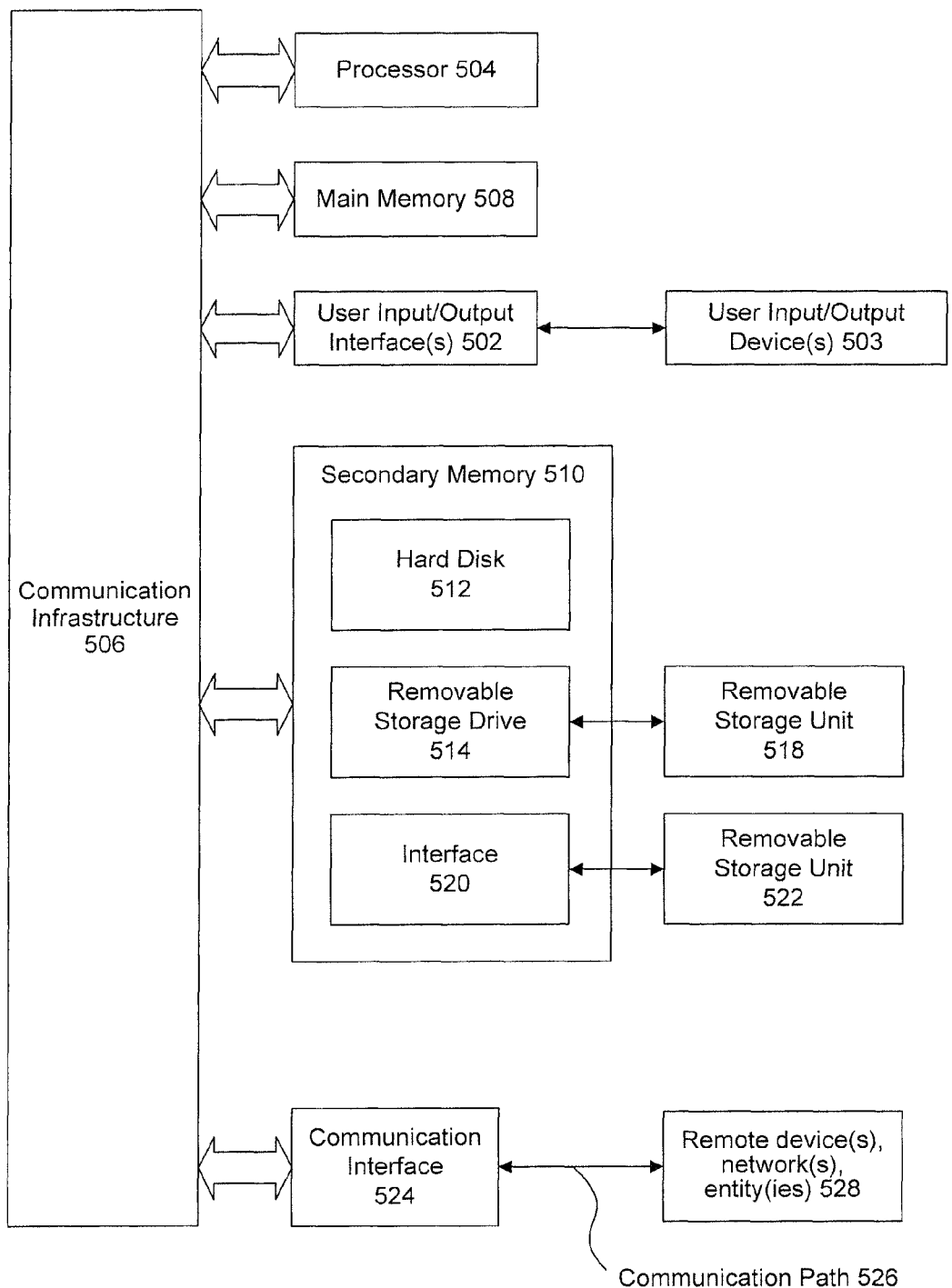
FIG. 5 is an exemplary computing device where the contemplated embodiments can be implemented.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

What is claimed is:

1. A computer-implemented method comprising:

accessing a data graph stored in memory of a database management system, wherein the data graph comprises a first plurality of vertices;

receiving a query graph, wherein the query graph comprises a second plurality of vertices, and wherein the query graph causes the database management system to retrieve data from the data graph as specified in the query graph;

executing in the database management system, the query graph against the data graph stored in the memory, wherein the execution generates an empty data set indicating data specified in the query graph does not exist in the data graph when the data specified in the query graph exists in the data graph; and based on the empty data set, generating a discovered component and a missing component of the query graph, wherein the discovered component includes a first vertex from the first and second plurality of vertices, and the missing component includes a second vertex from the second plurality of vertices that causes the database management system to generate the empty data set when executing the query graph.

2. The computer-implemented method of claim 1, further comprising:

receiving a query specifying the data in the data graph; and
converting the query into the query graph.

3. The computer-implemented method of claim 1, wherein the generating further comprises:

generating a maximum common sub-graph between the query graph and the data graph, wherein the maximum common sub-graph includes a maximum number of vertices that are common to the first and second plurality of vertices and wherein the maximum common sub-graph is the discovered component of the query graph.

4. The computer-implemented method of claim 3, wherein the generating further comprises:

generating a difference graph between the maximum common sub-graph and the query graph, wherein the difference graph indicates the missing component of the query graph.

5. The computer-implemented method of claim 4, further comprising:

adding one of the vertices in the maximum common sub-graph to the difference graph, wherein the one of the vertices is associated with an edge that is included in the difference graph.

6. The computer-implemented method of claim 3, wherein generating the maximum common sub-graph further comprises:

generating a list of maximum common sub-graphs, wherein the list includes a first maximum common sub-graph generated using the first vertex of the second plurality of vertices in the query graph and a second maximum common sub-graph generated using a third vertex of the second plurality of vertices; and selecting the maximum common sub-graph from the list.

7. The computer-implemented method of claim 1, wherein the data graph is a property graph and the database management system includes a column-based graph database.

8. The computer-implemented method of claim 7, wherein the property graph is represented as a set of tables including a first plurality of vertices and a plurality of edges in the property graph.

9. A system, comprising:
a memory configured to store a data graph of a database management system, wherein the data graph comprises a first plurality of vertices; and
one or more processors coupled to the memory and operable to:
receive a query graph, wherein the query graph comprises a second plurality of vertices, and wherein the query graph causes the one or more processors of the database management system to retrieve data from the data graph as specified in the query graph;
execute the query graph against the data graph stored in the memory, wherein the execution generates an empty data set indicating data specified in the query graph does not exist in the data graph when the data specified in the query graph exists in the data graph; and
based on the empty data set, generating a discovered component and a missing component of the query graph, wherein the discovered component includes a first vertex from the first and second plurality of vertices, and the missing component includes a second vertex from the second plurality of vertices that causes the one or more processors to generate the empty data set when executing the query graph.

10. The system of claim 9, wherein the one or more processors are further configured to:
receive a query specifying the data in the data graph; and
convert the query into the query graph.

11. The system of claim 9, wherein to generate the discovered component the one or more processors are further configured to:
generate a maximum common sub-graph between the query graph and the data graph, wherein the maximum common sub-graph includes a maximum number of vertices that are common to the first and second plurality of vertices and wherein the maximum common sub-graph is the discovered component of the query graph.

12. The system of claim 11, wherein to generate the missing component the one or more processors are further configured to:
generate a difference graph between the maximum common sub-graph and the query graph, wherein the difference graph indicates the missing component of the query graph.

13. The system of claim 12, wherein the one or more processors are further configured to:
add one of the vertices from the maximum common sub-graph to the difference graph, wherein the one of the vertices is associated with an edge that is included in the difference graph.

14. The system of claim 11, wherein to generate the maximum common sub-graph the one or more processors are further configured to:
generate a list of maximum common sub-graphs, wherein the list includes a first maximum common sub-graph generated using the first vertex of the second plurality of vertices in the query graph and a second maximum common sub-graph generated using a third vertex of the second plurality of vertices in; and
select the maximum common sub-graph from the list.

15. The system of claim 9, wherein the data graph is a property graph and the database management system includes a column-based graph database.

16. The system of claim 15, wherein the property graph is represented as a set of tables including a first plurality of vertices and a plurality of edges in the property graph.

17. A computer-readable medium having instructions stored thereon, that when executed by a computing device, causes the computing device to perform operations, the operations comprising:
accessing a data graph stored in memory of a database management system, wherein the data graph comprises a first plurality of vertices;
receiving a query graph, wherein the query graph comprises a second plurality of vertices, and wherein the query graph causes the database management system to retrieve data from the data graph as specified in the query graph;
executing in the database management system, the query graph against the data graph stored in the memory, wherein the execution generates an empty data set the query graph does not exist in the data graph when the data specified in the query graph exists in the data graph; and
based on the empty data set, generating a discovered component and a missing component of the query graph, wherein the discovered component includes a first vertex from the first and second plurality of vertices and the missing component includes a second vertex from the second plurality of vertices that causes the database management system to generate the empty data set when executing the query graph.

18. The computer-readable medium of claim 17, further comprising:
receiving a query specifying the data in the data graph; and
converting the query into the query graph.

19. The computer-readable medium of claim 17, wherein to generate the discovered component the computing device further performs operations, the operations comprising:
generating a maximum common sub-graph between the query graph and the data graph, wherein the maximum common sub-graph includes a maximum number of vertices that are common to the first and second plurality of vertices and wherein the maximum common sub-graph is the discovered component of the query graph.

20. The computer-readable medium of claim 17, wherein to generate the missing component the one or more processors are further configured to:
generate a difference graph between the maximum common sub-graph and the query graph, wherein the difference graph indicates the missing component of the query graph.

* * * * *